United States Patent [19]
Yamashita et al.

[11] Patent Number: 5,791,035
[45] Date of Patent: Aug. 11, 1998

[54] METHOD FOR MAKING A SENSOR ELEMENT

[75] Inventors: Kazuo Yamashita; Yasushi Sugiyama, both of Kanagawa-ken, Japan

[73] Assignee: Nok Corporation, Tokyo, Japan

[21] Appl. No.: 713,425

[22] Filed: Sep. 13, 1996

[30]  Foreign Application Priority Data

Sep. 13, 1995 [JP] Japan .................. 7-235511

[51] Int. Cl.$^6$ .............. B23P 17/00; B23Q 3/24; B24B 3/20
[52] U.S. Cl. .............. 29/423; 269/287; 451/460
[58] Field of Search .............. 29/423, 559; 269/40, 269/287, 254 R; 451/460, 287, 285, 290, 364

[56]  References Cited

U.S. PATENT DOCUMENTS

| | | | |
|---|---|---|---|
| 3,475,867 | 11/1969 | Walsh | 451/460 |
| 4,076,205 | 2/1978 | Almer et al. | 269/287 |
| 4,621,821 | 11/1986 | Schneider | 269/287 |
| 4,807,421 | 2/1989 | Araki et al. | 269/287 |

FOREIGN PATENT DOCUMENTS 58-149168 of 1983 Japan.

Primary Examiner—S. Thomas Hughes
Assistant Examiner—Tisa Stewart
Attorney, Agent, or Firm—Jacobson, Price, Holman & Stern, PLLC

[57] ABSTRACT

A plurality of holes 2, each of which permits insertion of a small-diameter of an article to be manufactured, are formed in a flexible metal retaining plate 1 having a thickness of about 100 micrometers. A pair of notches 3, 3 are formed in the internal periphery of each hole 2 so as to be opposite to each other, and a cantilever 4 is defined between a pair of the notches 3, 3. The small-diameter portion of the article to be manufactured is inserted into each hole 2, and the cantilevers 4 and the hole 2 are integrally fixed together by welding. A plurality of the articles to be manufactured retained by the retaining plate 1 are fed as a unit to a surface abrasion step, a film-forming step, and others. As a result, a plurality of sensor elements can be simultaneously manufactured.

9 Claims, 13 Drawing Sheets

METHOD FOR MAKING A SENSOR ELEMENT

BACKGROUND OF THE INVENTION

The present invention relates to a method of manufacturing a sensor element a pressure sensor, a load sensor, etc., and more particularly to a sensor element manufacturing method capable of simultaneously manufacturing a plurality of sensor elements by feeding a plurality of articles to be manufactured at one time and processing them in each manufacturing step.

In general, a sensor element used in a pressure sensor, a load sensor, etc. has such a construction as shown in FIG. 6(a).

Namely, a sensor element 5 has a cylindrical shape whose one end is closed, and a circumferential surface formed into two stages; namely, a large-diameter portion 5a and a small-diameter portion 5b. A strain gauge (not shown) is formed on an upper surface (a closed portion) of the large-diameter portion 5a in a predetermined pattern by a film-forming method such as evaporation or sputtering.

Such a sensor element is manufactured through seven steps; namely, "a cutting work or forging step," "a cleaning step," "a surface abrasion step," "a cleaning step," "a film-forming (a functional film-forming through an evaporation operation, a sputtering operation, etc.) step," "a patterning step (a spin coating operation, an exposure operation, an etching operation, etc.)," and "a cleaning step," as shown in FIG. 19. Since there is no effective conventional means for feeding and processing a plurality of articles to be manufactured in each step at one time, they must be fed to and processed in each step one by one. Therefore, it takes a long time to manufacture a plurality of the sensor elements 5, which in turn results in significantly lowered productivity.

For example, the "surface abrasion step" will be hereinafter described. A holder 60, see FIG. 20 in which a plurality of holes 61 are formed so as to permit the insertion of articles 6 to be manufactured, is placed on top of a turn table 65 to be supported by a guide 64. The articles 6 to be manufactured are inserted into the holes 61 of the holder 60, and a weight 67 is placed on the articles 6 to be manufactured via an elastic material 66, so that the articles 6 to be manufactured are pressed against the turn table 65. In this state, a plurality of the articles 6 to be manufactured are simultaneously abraded by rotating the turn table 65.

At this time, variations in the heights of the articles 6 to be manufactured are compensated for by elastic deformation of the elastic material 66, so that the articles to be manufactured are abraded in decreasing order of height, and the heights of the articles become gradually uniform. In the end, all of the articles are finished to have a uniform height.

However, the articles 6 to be manufactured must be inserted into the holes 61 of the holder 60 one by one, which requires much labor. Where the articles 6 to be manufactured have large variations in height, it is impossible to completely compensate for the variations even by means of the deformation of the elastic material 66. As a result, the articles having shorter lengths become insufficiently abraded, which results in sagged areas arising on an abraded surface of the article. Even in the case where the sensor element 5 has such a cylindrical shape as shown in FIG. 6(b), similar problems to the foregoing will arise.

Japanese Patent Laid-Open patent Specification No. 58-149168 discloses a method of abrading a wafer. According to this abrading method, work pieces are respectively retained in a plurality of holes formed in the holder, and the thus retained articles are sandwiched between upper and lower turn tables, whereby both surfaces of a plurality of the work pieces are simultaneously abraded.

Even with such an abrading method, the work pieces must be inserted into the holes of the holder one by one, which requires much labor. Further, the work pieces are not completely fixed in the respective holes, which results in sagged areas arising in an abraded surface of the article.

The present invention has been conceived to solve the foregoing drawbacks in the prior art, and the object of the present invention is to provide a sensor element manufacturing method capable of significantly increasing productivity by feeding and processing a plurality of articles to be manufactured in each manufacturing step at one time.

SUMMARY OF THE INVENTION

To solve the above-described drawbacks in the prior art, the present invention provides a method of manufacturing a substantially cylindrical sensor element having one end closed which comprises the steps of:

fixing a plurality of articles to be manufactured to a flexible plate while the surfaces of the article which are to be processed are directed so as to face in the direction in which the flexible plate deflects; and feeding the articles to be manufactured to manufacturing steps, such as abrasion and film-forming steps, as a unit, so that a plurality of sensor elements are simultaneously processed.

Further, the present invention provides a method of manufacturing a substantially cylindrical sensor element having one end closed which comprises the steps of:

forming a plurality of holes in a flexible plate;

forming at least two cantilevers in each hole so as to radially project;

fixing the two cantilevers to each of the articles to be manufactured while the surfaces of the articles which are to be processed are directed so as to face in the direction in which the flexible plate deflects; and feeding the articles to be manufactured to manufacturing steps, such as abrasion and film-forming steps, as a unit, so that a plurality of sensor elements are simultaneously processed.

By virtue of the above-described steps of the present invention, the articles to be manufactured having a substantially cylindrical shape whose one end is closed are fixed to the flexible plate while the surfaces of the articles which are to be processed are directed so as to face in the direction in which the flexible plate deflects, and thus fixed articles to be manufactured are fed to and processed in each manufacturing step as a unit In consequence, even if the respective articles to be manufactured have variations in height, the flexible plate deflects in the direction of the heights of the articles to be manufactured, whereby the variations are compensated for by displacement of the flexible plate in the direction of the heights of the articles to be manufactured. Further, even if the rigidity of the flexible plate becomes increased as a result of a plurality of the articles to be manufactured being fixed to the flexible plate, variations in the direction of the heights of the articles to be manufactured are compensated for by the deflection of the cantilevers of each hole.

EMBODIMENTS

Figure 1:
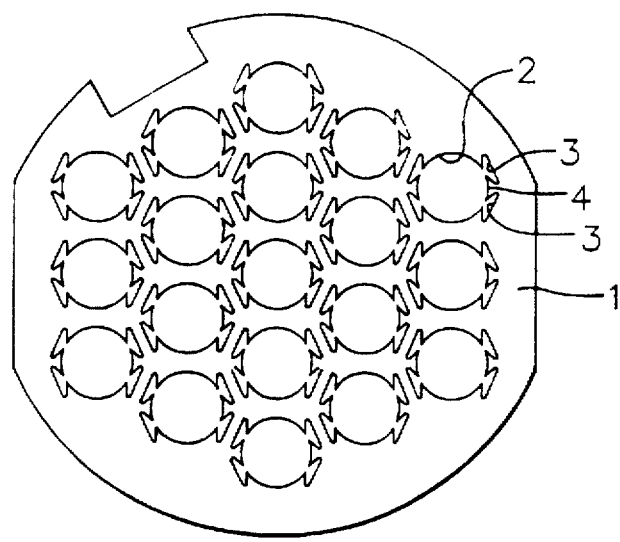
FIG. 1 is a plan view of a retaining plate for use in a sensor element manufacturing method according to a first embodiment of the present invention.

Embodiments of a sensor element manufacturing method of the present invention shown in the drawings will be described hereinbelow.

Figure 2:
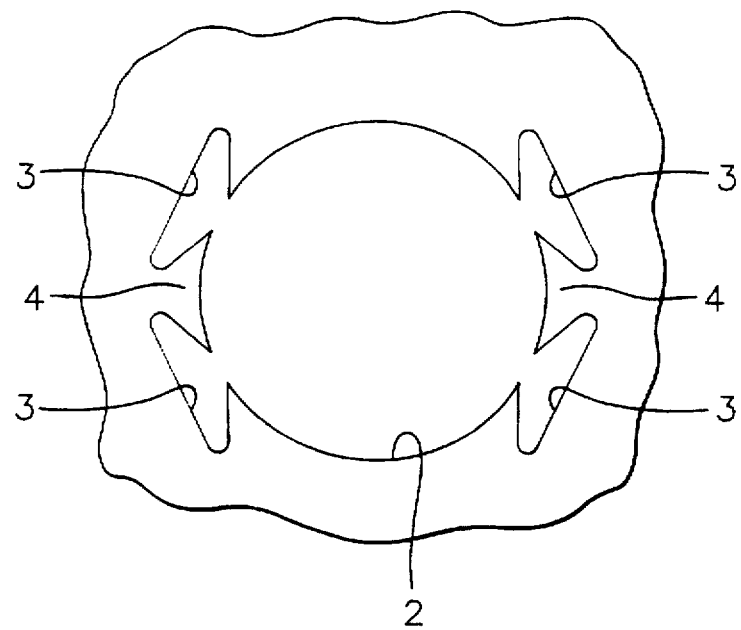
FIG. 2 is a partially enlarged view of the retaining plate shown in FIG. 1.
Figure 4A:
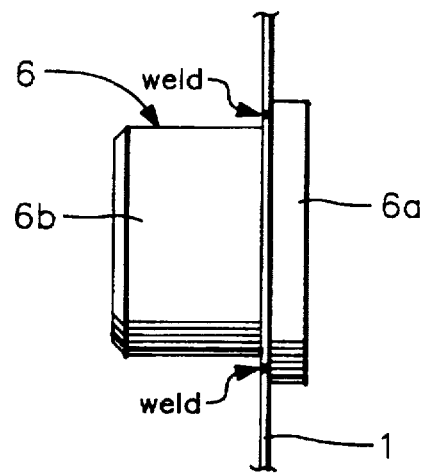
FIG. 4(a) is a side view of the article to be manufactured shown in FIG. 3(a) when it is retained by the retaining plate.
Figure 4B:
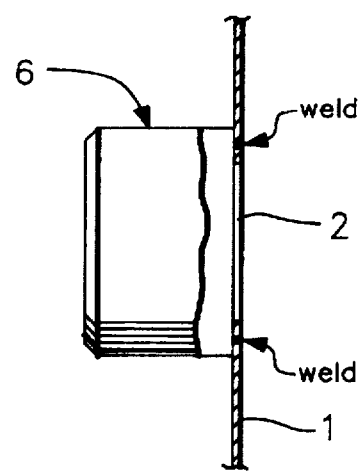
FIG. 4(b) is a side view of the article to be manufactured shown in FIG. 3(b) when it is retained by the retaining plate.
Figure 5:
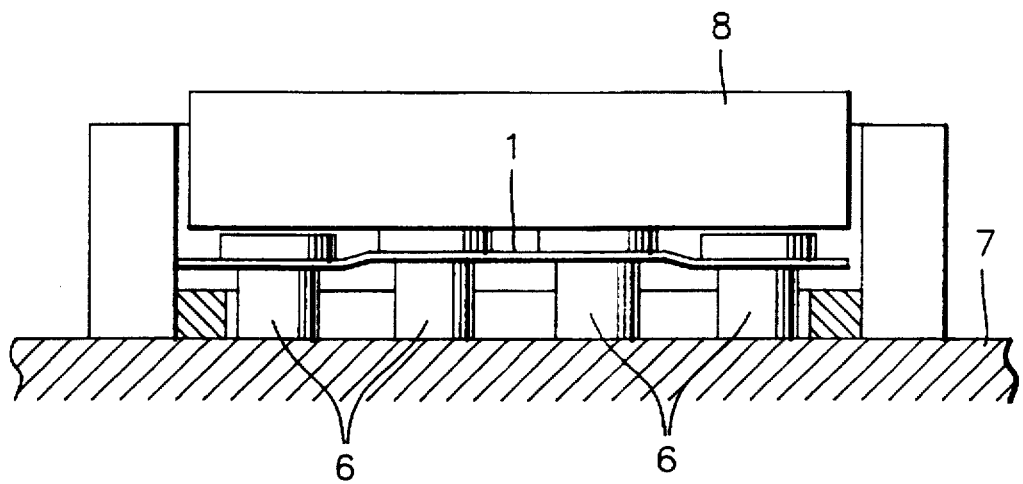
FIG. 5 is an illustrative representation of a plurality of articles to be manufactured retained by the retaining plate shown in FIG. 1 when they are fed to a surface abrasion step as a unit.

FIGS. 1 to 5 illustrate a retaining plate and an article to be manufactured for use in a sensor element manufacturing method according to a first embodiment of the present invention. FIG. 1 is a plan view of a retaining plate for retaining articles to be manufactured. FIG. 2 is a partially enlarged view of the retaining plate shown in FIG. 1. FIG. 3(a) is a partially enlarged view of the retaining plate when it retains the article to be manufactured shown in FIG. 1. FIG. 4(a) is a side view of the retaining plate that retains the article to be manufactured shown in FIG. 3(a). FIG. 5 is an illustrative representation of the articles to be manufactured when they are fed to a surface abrasion step while being retained by the retaining plate shown in FIG. 1.

Figure 6A:
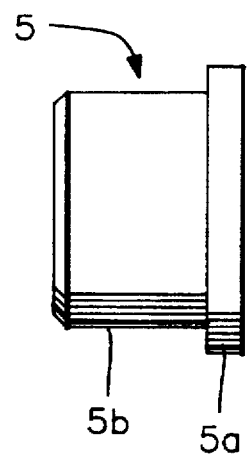
FIG. 6(a) is a plan view of one example of a conventional sensor element as well as a sensor element of the present invention.

In short, the sensor element manufacturing method of the first embodiment is based on a method of manufacturing a sensor element 5 (see FIG. 6(a)) that has a cylindrical shape whose one end is closed and consists of two portions namely, a large-diameter portion 5a and a small-diameter portion 5b. The sensor element manufacturing method of the present embodiment is arranged in such a way that a retaining plate 1 retains a plurality of articles 6 to be manufactured (see FIGS. 3(a), 4(a), and 5), each article having a cylindrical shape whose one end is closed and a circumferential surface formed into two portions namely, a large-diameter portion 6a and a small-diameter portion 6b. Further, these articles to be manufactured are fed to and processed in each step as a unit, whereby a plurality of the sensor elements 5 are simultaneously manufactured.

The retaining plate 1 is a thin metallic plate that has a thickness of about 100 micrometers, for example, a flexible thin plate consisting of stainless steel possessing superior corrosion resistance. A plurality of holes 2 which permit insertion of the small-diameter portions 6b of the articles 6 to be manufactured are formed in the retaining plate 1 by etching, punching or the like. Two pairs of triangular notches 3,3 are formed along the internal periphery of each hole 2 so as to be opposite to each other. A triangular cantilever 4 for supporting the article to be manufactured is thus defined between each pair of the adjacent notches 3, 3.

To cause the above-described retaining plate 1 to retain a plurality of the articles 6 to be manufactured, the small-diameter portion 6b of the article 6 to be manufactured is inserted into each hole 2 to integrally fix the cantilevers 4 of each hole 2 to the large-diameter portion 6a of each article 6 to be manufactured by means of series welding, or the like. In this case, a weld strength is set to such an extent that the articles to be manufactured are not disconnected from the retaining plate during the course of processing in each step, but easily disconnected therefrom after the completion of each step.

A plurality of the articles 6 to be manufactured retained by the retaining plate 1 are fed to and processed in each of the steps such as abrasion and film-forming steps as a unit to thereby simultaneously manufacture a plurality of the sensor elements 5.

For instance, the "surface abrasion step" will be described. A plurality of the articles 6 to be manufactured retained by the retaining plate 1 are placed on the turn table 7 together with the retaining plate 1. A weight 8 is placed on the articles 6 to be manufactured, so that they are pressed against the turn table 7 (see FIG. 5).

In this case, variations in the heights of the articles 6 to be manufactured are compensated for by displacement of the flexible retaining plate 1 toward the direction of the heights of the articles 6 to be manufactured, and each article 6 to be manufactured is completely fixed by the retaining plate 1 by means of the cantilevers 4 of each hole 2.

With this construction, each article 6 to be manufactured will not move in each hole 2 even if the turn table 7 is rotated. Further, even if the pressing force exerted on the turn table 7 becomes partially insufficient for reasons of large variations in the heights of the articles 6 to be manufactured, no sagged areas will arise on an abraded surface. The articles 6 to be manufactured are abraded in decreasing order of height, so that the heights of all the articles to be manufactured become gradually uniform. In the end, all the articles to be manufactured are finished to a uniform height.

Figure 3A:
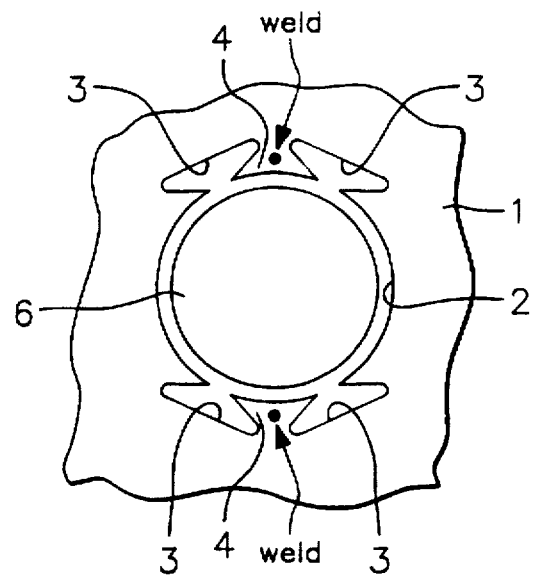
FIG. 3(a) is a partially enlarged view of the retaining plate shown in FIG. 1 when it retains an article to be manufactured.
Figure 3B:
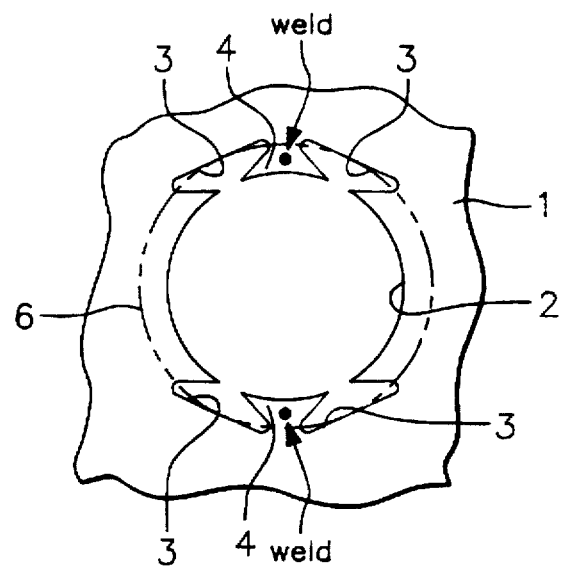
FIG. 3(b) is a partially enlarged view of the retaining plate when it retains another example of an article to be manufactured.
Figure 6B:
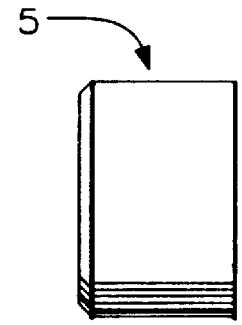
FIG. 6(b) is a plan view of another example of the sensor element.

As a result of a plurality of the articles 6 to be manufactured retained by the retaining plate 1 being fed to and processed in each step as a unit, it is possible to considerably reduce the time required to carry out an abrading operation in the abrasion step, spin coating and exposure operations in the film-forming step, and a cleaning operation in the cleaning step, as compared with the conventional method in which the articles 6 to be manufactured are fed to and processed in each step one by one, to thereby considerably increase the productivity of the sensor element. The article 6 to be manufactured is not limited to that having a flange. An article to be manufactured, which is cylindrical as shown in FIGS. 3(b) and 4(b), may also be fixed to the retaining plate in the same manner as previously described. Here, the sensor element 5 has such a shape as shown in FIG. 6(b).

Figure 7:
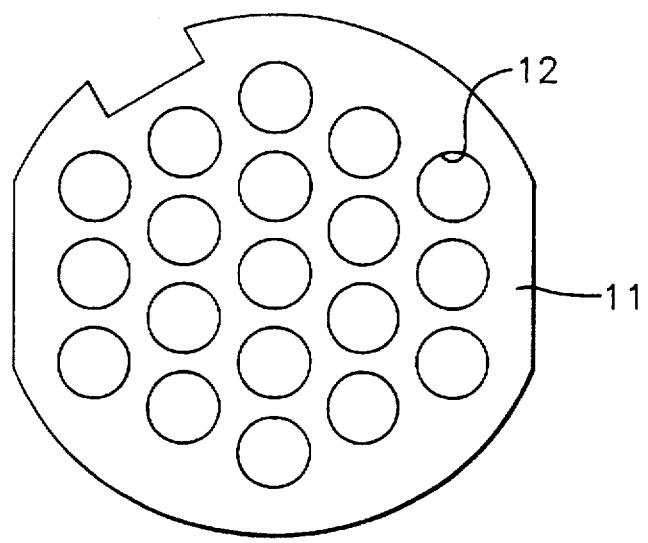
FIG. 7 is a plan view of a retaining plate for use in a sensor element manufacturing method according to a second embodiment of the present invention.
Figure 8:
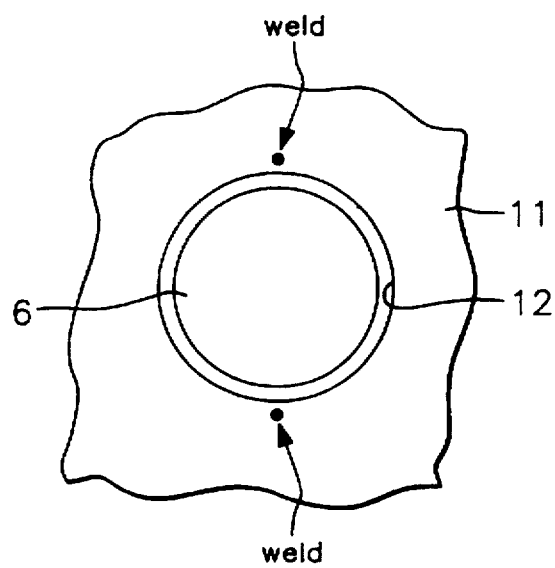
FIG. 8 is a partially enlarged view of the retaining plate shown in FIG. 7 when it retains an article to be manufactured.
Figure 9A:
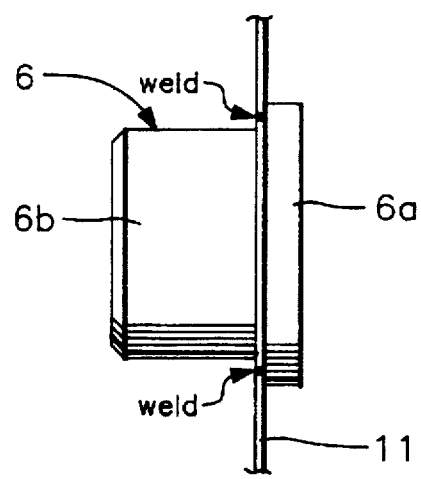
FIG. 9(a) is a side view of the retaining plate shown in FIG. 8.
Figure 9B:
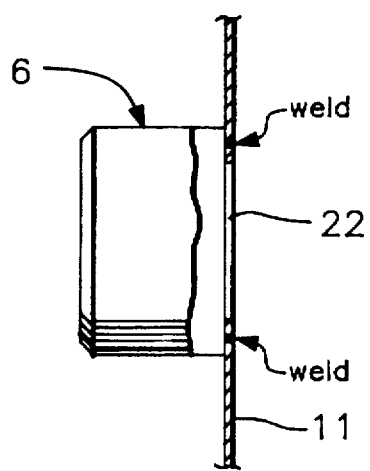
FIG. 9(b) is a side view of the retaining plate when it retains another article to be manufactured.

FIGS. 7 to 9A illustrate a retaining plate and an article to be manufactured for use in a sensor element manufacturing method according to a second embodiment of the present invention. FIG. 7 is a plan view of a retaining plate for retaining articles to be manufactured, and FIG. 8 is a partially enlarged view of the retaining plate shown in FIG. 7 while it retains the article to be manufactured. FIG. 9(a) is a side view of the article to be manufactured retained by the retaining plate shown in FIG. 8.

In short, as in the first embodiment, the sensor element manufacturing method of the second embodiment is also based on the method of manufacturing the sensor element 5 (see FIG. 6(a)) that has a cylindrical shape whose one end is closed, and a circumferential surface formed into two portions: namely, the large-diameter portion 5a and the small-diameter portion 5b. The sensor element manufacturing method of the present embodiment is arranged in such a way that a retaining plate 11 retains a plurality of the articles 6 to be manufactured (see FIGS. 8 and 9(a)), each article having a cylindrical shape whose one end is closed, and a circumferential surface formed into two portions: namely, the large-diameter portion 6a and the small-diameter portion 6b. Further, these articles to be manufactured are fed to and processed in each step as a unit, whereby a plurality of the sensor elements 5 are simultaneously manufactured.

The retaining plate 11 is a thin metallic plate that has a thickness of about 100 micrometers, for example, a flexible thin plate consisting of stainless steel possessing superior corrosion resistance. A plurality of holes 12 which permit insertion of the small-diameter portions 6b of the articles 6 to be manufactured are formed in the retaining plate 11 by etching, punching or the like.

To cause the above-described retaining plate 11 to retain a plurality of the articles 6 to be manufactured, the small-diameter portion 6b of the article 6 to be manufactured is inserted into each hole 12, and the large-diameter portion 6a of the article 6 to be manufactured is integrally fixed to the periphery of each hole 12 by series welding or the like. In this case, the weld strength is set to such an extent that the articles to be manufactured are not disconnected from the retaining plate during the course of processing in each step, but easily disconnected therefrom after the completion of each step.

A plurality of the articles 6 to be manufactured retained by the retaining plate 11 are fed to and processed in each of the steps such as abrasion and film-forming steps, along with the retaining plate 11, to thereby simultaneously manufacture a plurality of the sensor elements 5.

As a result, since it is possible to feed to each step and process at a time a plurality of the articles 6 to be manufactured, it is possible to considerably reduce the time required to carry out an abrading operation in the abrasion step, spin coating and exposure operations in the film-forming step, and a cleaning operation in the cleaning step, as compared with the conventional method in which the articles 6 to be manufactured are fed to and processed in each step one by one, to thereby considerably increase the productivity of the sensor element.

Variations in the heights of the articles 6 to be manufactured are compensated for by displacement of the flexible retaining plate 11 toward the direction of the heights of the articles 6 to be manufactured. See FIG. 5, and each article 6 to be manufactured is completely fixed by the retaining plate 11 by means of each hole 12. Therefore, the article 6 to be manufactured will not move in each hole 12 even if the turn table 7 (see FIG. 5) is rotated. Further, even if the pressing force exerted on the turn table 7 becomes partially insufficient for reasons of large variations in the heights of the articles 6 to be manufactured, no sagged areas will arise on an abraded surface. The articles 6 to be manufactured are abraded in decreasing order of height, so that the heights of all the articles to be manufactured become gradually uniform. In the end, all the articles to be manufactured are finished to a uniform height. The article 6 to be manufactured 6 is not limited to that having a flange. An article to be manufactured which is cylindrical as shown in FIG. 9(a) may also be fixed to the retaining plate in the same manner as previously described. In this case, the sensor element 5 has such a shape as shown in FIG. 6(b).

Figure 10:
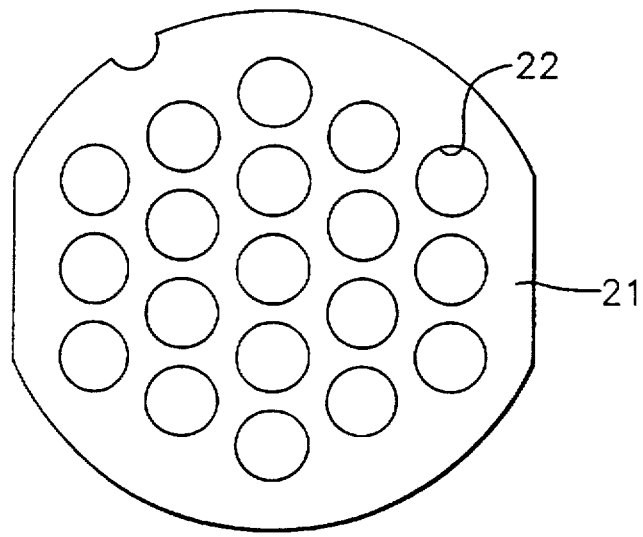
FIG. 10 is a plan view of a retaining plate for use in a sensor element manufacturing method according to a third embodiment of the present invention.
Figure 11:
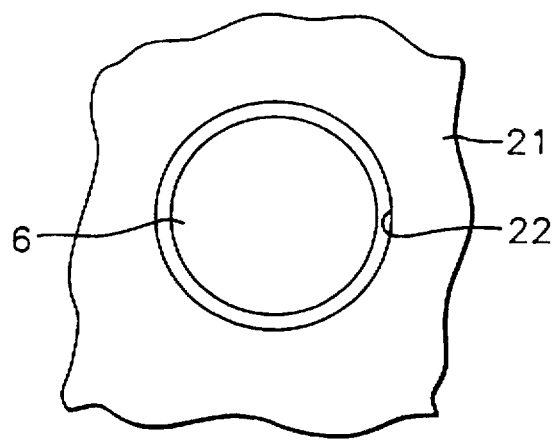
FIG. 11 is a partially enlarged view of the retaining plate shown in FIG. 10 when it retains an article to be manufactured.
Figure 12:
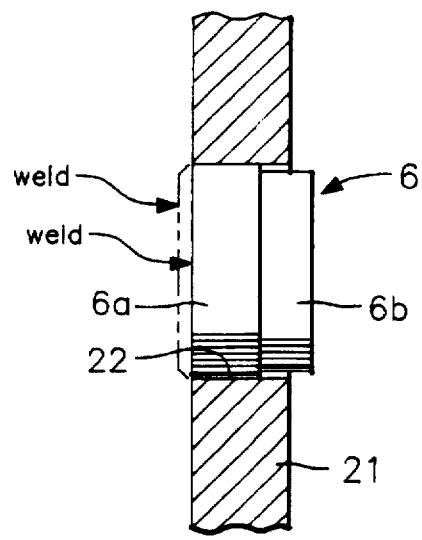
FIG. 12 is a side view of the retaining plate shown in FIG. 11.

FIGS. 10–12 illustrate a retaining plate and an element to be manufactured for use in a sensor element manufacturing method according to a third embodiment of the present invention. FIG. 10 is a plan view of a retaining plate for retaining articles to be manufactured, and FIG. 11 is a partially enlarged view of the retaining plate shown in FIG. 10 while it retains the article to be manufactured. FIG. 12 is a side view of the article to be manufactured retained by the retaining plate shown in FIG. 11.

In short, as in the first embodiment, the sensor element manufacturing method of the third embodiment is also based on the method of manufacturing the sensor element 5 (see FIG. 6(a)) that has a cylindrical shape whose one end is closed, and a circumferential surface formed into two stages: namely, the large-diameter portion 5a and the small-diameter portion 5b. The sensor element manufacturing method of the present embodiment is arranged in such a way that a retaining plate 21 retains a plurality of the articles 6 to be manufactured (see FIGS. 11 and 12), each article having a cylindrical shape whose one end is closed, and a circumferential surface formed into two portions: namely, the large-diameter portion 6a and the small-diameter portion 6b. Further, these articles to be manufactured are fed to and processed in each step as a unit, whereby a plurality of the sensor elements 5 are simultaneously manufactured.

The retaining plate 21 is a thin metallic plate (e.g., stainless steel possessing superior corrosion resistance) or a resilient plastic thin plate having a metal coating thereon. A plurality of holes which permit insertion of the small-diameter portions 6b or the large-diameter portions 6a (the large-diameter portions 6a in the third embodiment) of the articles 6 to be manufactured are formed in a plurality of portions of the articles 6 to be manufactured by etching, punching or the like.

To cause the above-described retaining plate 21 to retain a plurality of the articles 6 to be manufactured, the large-diameter portion 6a of the article 6 to be manufactured is inserted into each hole 22 and welded as shown in FIG. 12.

A plurality of the articles 6 to be manufactured retained by the retaining plate 21 are fed to and processed in each of the steps such as abrasion and film-forming steps, along with the retaining plate 21, to thereby simultaneously manufacture a plurality of the sensor elements 5.

Therefore, it is possible to considerably reduce the time required to carry out an abrading operation in the abrasion step, to thereby considerably increase the productivity of the sensor element.

Variations in the heights of the articles 6 to be manufactured are compensated for by displacement of the flexible retaining plate 21 toward the direction of the heights of the articles 6 to be manufactured, and each article 6 to be manufactured is completely fixed by the retaining plate 21 by means of each hole 22. Therefore, the article 6 to be manufactured will not move in each hole 22 even if the turn table 7 (see FIG. 5) is rotated. Further, even if the pressing force exerted on the turn table 7 becomes partially insufficient for reasons of large variations in the heights of the articles 6 to be manufactured, no sagged areas will arise on an abraded surface. The articles 6 to be manufactured are abraded in decreasing order of height, so that the heights of all the articles to be manufactured become gradually uniform. In the end, all the articles to be manufactured are finished to a uniform height.

Although the articles 6 to be manufactured are fixed to the retaining plates 1, 11, and 21 by welding or fitting in the first, second, and third embodiments, similar effects are produced by fixing them to the retaining plates using an adhesive.

Figure 13:
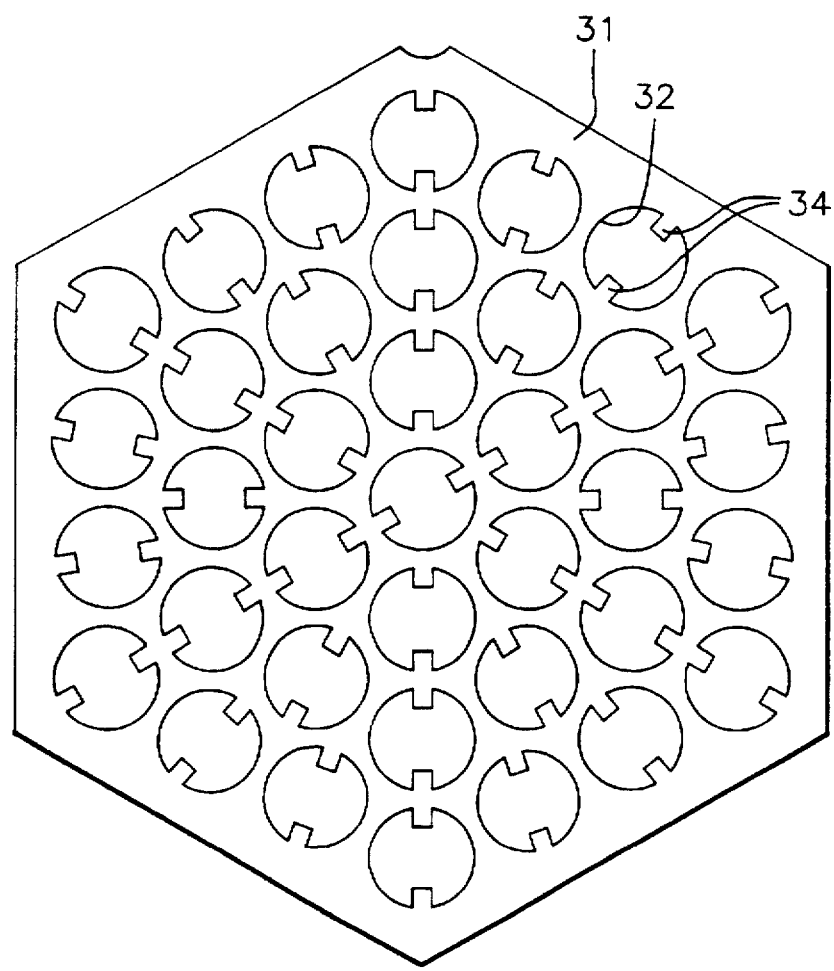
FIG. 13 is a plan view of a retaining plate for use in a sensor element manufacturing method according to a fourth embodiment of the present invention.
Figure 14:
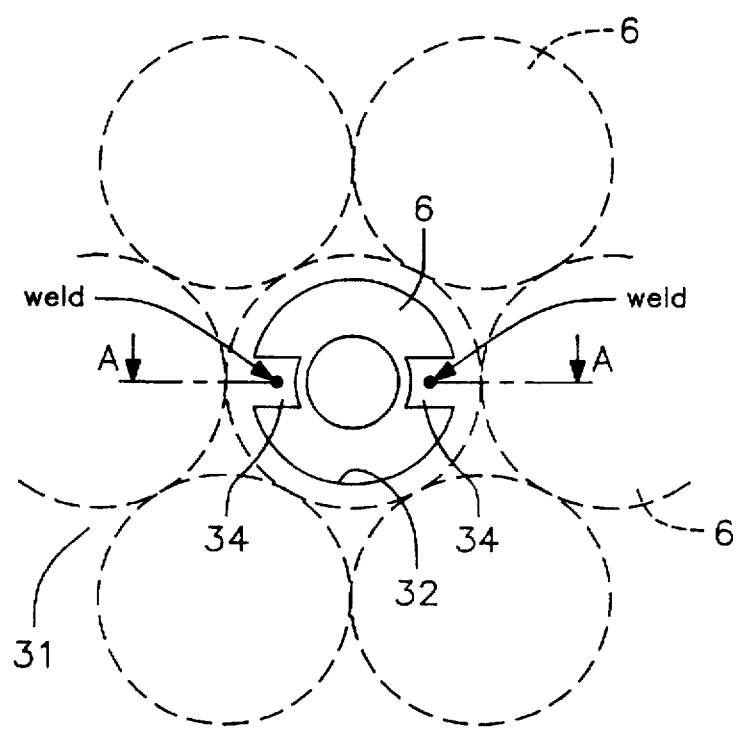
FIG. 14 is a partially enlarged view of the retaining plate shown in FIG. 13 when it retains an article to be manufactured.
Figure 15A:
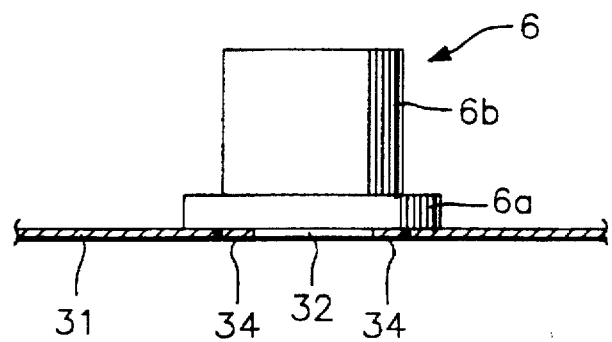
FIG. 15(a) is a partially cross-sectional view of the retaining plate shown in FIG. 14 taken along line A—A.

FIGS. 13–15(a) illustrate a retaining plate and an article to be manufactured for use in a sensor element manufacturing method according to a fourth embodiment of the present invention. FIG. 13 is a plan view of a retaining plate for retaining articles to be manufactured, and FIG. 14 is a partially enlarged view of the retaining plate shown in FIG. 13 while it retains the article to be manufactured. FIG. 15(a) is a partially cross-sectional view of the article to be manufactured and the retaining plate shown in FIG. 14 taken along line A—A.

In short, as in the first embodiment, the sensor element manufacturing method of the third embodiment is also based on the method of manufacturing the sensor element 5 (see FIG. 6(a)) that has a cylindrical shape whose one end is closed, and a circumferential surface formed into two stages: namely, the large-diameter portion 5a and the small-diameter portion 5b. The sensor element manufacturing method of the present embodiment is arranged in such a way that a retaining plate 31 retains a plurality of the articles 6 to be manufactured (see FIG. 15(a)), each article having a cylindrical shape whose one end is closed, and a circumferential surface formed into two portions: namely, the large-diameter portion 6a and the small-diameter portion 6b. Further, these articles to be manufactured are fed to and processed in each step as a unit, whereby a plurality of the sensor elements 5 are simultaneously manufactured.

The retaining plate 31 is a thin metallic plate that has a thickness of about 100 micrometers, for example, a flexible thin plate consisting of stainless steel possessing superior corrosion resistance. A plurality of holes 32, each having a smaller diameter than that of the large-diameter section 6a of the article 6 to be manufactured are formed in a plurality of portions of the retaining plate 31 by etching, punching, or the like. A pair of cantilevers 34, 34 are formed in the internal periphery of each hole 32 so as to be opposite to each other in the radial direction of the hole. More than one pair of cantilevers 34, 34 may be formed in the internal periphery of each hole 32 so as to be opposite to each other.

To cause the retaining plate 31 having the above-described construction to retain a plurality of the articles 6,6, ... to be manufactured, a plurality of the articles 6,6, ... to be manufactured are placed on the retaining plate 31 so as to close the respective holes 32. The end face of the large-diameter portion 6a of each article 6 to be manufactured and the cantilevers 34, 34 of each hole 32 are integrally fixed to each other by series welding, or the like. In this case, the weld strength is set to such an extent that the articles to be manufactured are not disconnected from the retaining plate during the course of processing in each step, but easily disconnected therefrom after the completion of each step.

A plurality of the articles 6,6, ... to be manufactured retained by the retaining plate 31 are fed to and processed in each of the steps such as abrasion and film-forming steps, along with the retaining plate 31, to thereby simultaneously manufacture a plurality of the sensor elements 5, 5, . . . .

Each article 6 to be manufactured is completely fixed to the retaining plate 31 by means of the cantilevers 34, 34 of each hole 32. Therefore, the article 6 to be manufactured will not move in each hole 32 in the course of the surface abrasion step or the like. Further, even if the pressing force exerted on the turn table becomes partially insufficient for reasons of large variations in the heights of the articles 6 to be manufactured, no sagged areas will arise on an abraded surface. The articles 6 to be manufactured are abraded in decreasing order of height, so that the heights of all the articles to be manufactured become gradually uniform. In the end, all the articles to be manufactured are finished to a uniform height.

As a result, since it is possible to feed to each step and process at a time a plurality of the articles 6 to be manufactured, it is possible to considerably reduce the time required to carry out an abrading operation in the abrasion step, spin coating and exposure operations in the film-forming step, and a cleaning operation in the cleaning step, as compared with the conventional method in which the articles 6 to be manufactured are fed to and processed in each step one by one, to thereby considerably increase the productivity of the sensor element.

The plurality of articles 6,6, ... to be manufactured are placed on the retaining plate 31 and the end face of the large-diameter portion 6a of each article 6 to be manufactured is welded to the cantilevers 34, 34 formed in the internal periphery of each hole 32, so that as compared with the retaining plate of the first embodiment, the retaining plate of the fourth embodiment can hold a larger number of articles 6 to be manufactured.

Although the tolerance of height of all the articles 6 to be manufactured can be generally set tightly from a processing viewpoint, the tolerance of the height of the large-diameter portion 6a cannot be rigorously set. In the first embodiment, the variations in the heights of the large-diameter portions 6a account for the variations in the heights of all the articles 6 to be manufactured. Therefore, the spring constant of the cantilever is reduced by increasing the length of the cantilevers 4, 4 of each hole 2 in order to render the retaining plate 1 easy to displace in the direction of the height of the retaining plate 1 in the abrasion step and others. Variations in the heights of the articles to be manufactured 6 are compensated for by displacement of the retaining plate 1.

Figure 15B:
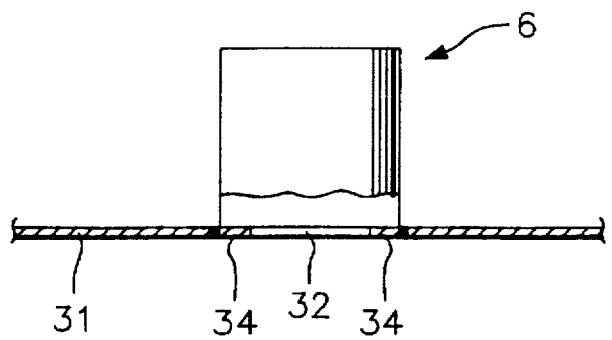
FIG. 15(b) is a partially cross-sectional view of the retaining plate when it retains another article to be manufactured.

In contrast, according to the fourth embodiment, the end face of the large-diameter portion 6a of the article 6 to be manufactured is welded to the cantilevers 34, 34. Accordingly, the variations in the heights of the large-diameter portion 6a do not account for the variations in the heights of all the articles 6 to be manufactured. Even if the spring constant of the hole is increased by reducing the length of the cantilevers 34, 34 of each hole 32, a plurality of articles 6 to be manufactured can be formed to a predetermined height without sagged areas. It is possible to reduce the interval between the holes 32 as compared with the interval of the holes 2 of the first embodiment As a result, the number of the articles 6 to be manufactured that the retaining plate 31 is able to retain can be increased as compared with the number of the articles to be manufactured in the first embodiment. It is therefore possible to improve the productivity of the sensor element to a greater extent. The articles 6 to be manufactured are not limited to that having a flange. An article to be manufactured which is cylindrical as shown in FIG. 15(b) may also be fixed to the retaining plate in the same manner as previously described. In this case, the sensor element 5 has such a shape as shown in FIG. 6(b).

Figure 16:
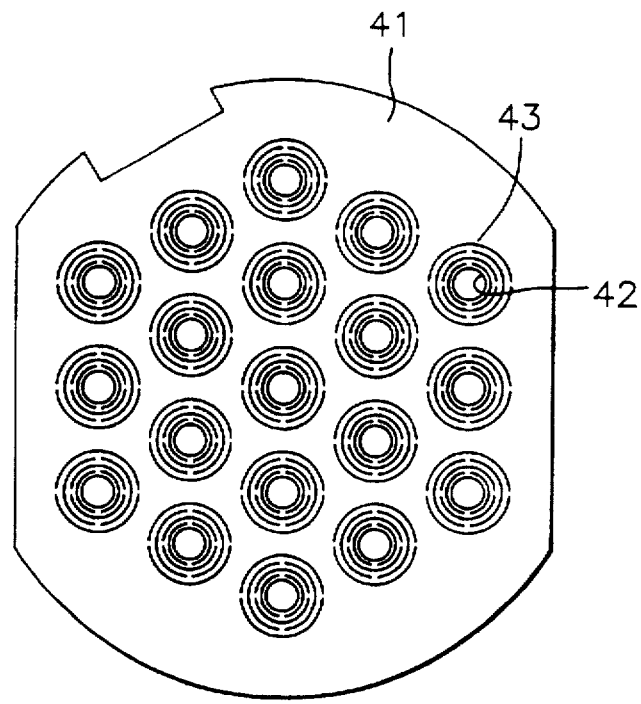
FIG. 16 is a plan view of a retaining plate for use in a sensor element manufacturing method according to a fifth embodiment of the present invention.
Figure 17:
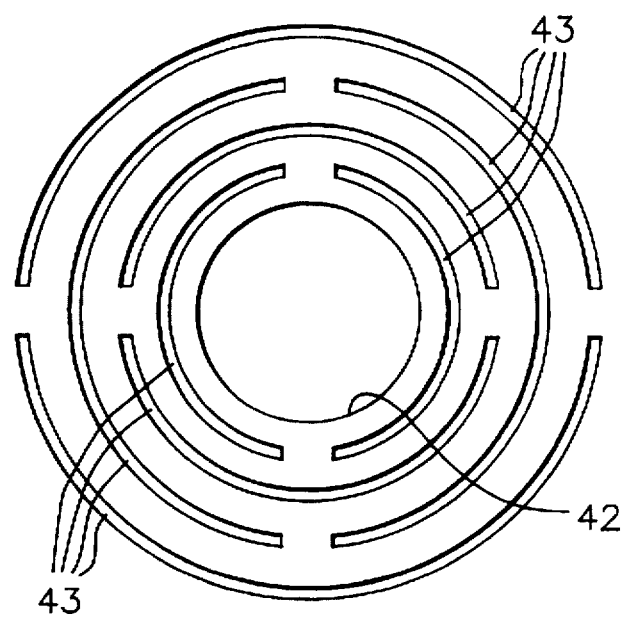
FIG. 17 is a partially enlarged view of the retaining plate shown in FIG. 16.

FIGS. 16 and 17 illustrate a retaining plate and cuts formed in the retaining plate which are used in a sensor element manufacturing method according to a fifth embodiment of the present invention. FIG. 16 is a plan view of a retaining plate for retaining articles to be manufactured, and FIG. 17 is a partially enlarged view of the retaining plate shown in FIG. 16 while it retains the article to be manufactured.

In short, as in the first embodiment, the sensor element manufacturing method of the fifth embodiment is also based on the method of manufacturing the sensor element 5 (see FIG. 6(a)) that has a cylindrical shape whose one end is closed, and a circumferential surface formed into two stages: namely, the large-diameter portion 5a and the small-diameter portion 5b. The sensor element manufacturing method of the present embodiment is arranged in such a way that a retaining plate 41 retains a plurality of the articles 6 to be manufactured, each article having a cylindrical shape whose one end is closed, and a circumferential surface formed into two stages: namely, the large-diameter portion 6a and the small-diameter portion 6b. Further, these articles to be manufactured are fed to and processed in each step as a unit, whereby a plurality of the sensor elements 5 are simultaneously manufactured.

The retaining plate 41 is a thin metallic plate that has a thickness of about 100 micrometers, for example, a flexible thin plate consisting of stainless steel possessing superior corrosion resistance, or a thick metallic plate that has a thickness greater than the thin plate, for example, a flexible thin plate consisting of stainless steel possessing superior corrosion resistance. A plurality of holes 42 that permit insertion of the small-diameter portion 6b of the article 6 to be manufactured are formed in the retaining plate 41 by etching, punching, or the like and a plurality of cuts 43 are formed so as to surround each hole 42, whereby a spring structure is formed around each hole 42 by the plurality of cuts 43.

The cuts 43 comprise a plurality of pairs of circular-arc cuts that are concentrically formed so as to be opposite to each other around the hole 42, and a plurality of pairs of the circular-arc cuts are concentrically formed in a staggered pattern from the inside toward the outside. A spring structure is formed so as to surround the hole 42 by means of a plurality of pairs of the cuts 43.

To cause the above-described retaining plate 41 to retain a plurality of articles 6 to be manufactured, the small-diameter portion 6b of the article 6 to be manufactured is inserted into each hole 42. The large-diameter portion 6a of the article 6 to be manufactured is integrally fixed to the area around each hole 42 other than the cuts 43 by series welding or the like. In this case, the weld strength is set to such an extent that the articles to be manufactured are not disconnected from the retaining plate during the course of processing in each step, but easily disconnected therefrom after the completion of each step.

A plurality of the articles 6 to be manufactured retained by the retaining plate 41 are fed to and processed in each of the steps such as abrasion and film-forming steps as a unit to thereby simultaneously manufacture a plurality of the sensor elements 5.

In this case, each article 6 to be manufactured is fixed to the surrounding area of each hole 42. Therefore, the article 6 to be manufactured will not move in each hole 42 in the course of the surface abrasion step or the like. Further, even if the pressing force exerted on the turn table becomes partially insufficient for reasons of large variations in the heights of the articles 6 to be manufactured, no sagged areas will arise on an abraded surface. The articles 6 to be manufactured are abraded in decreasing order of height, so that the heights of all the articles to be manufactured become gradually uniform. In the end, all the articles to be manufactured are finished to a uniform height.

As a result, since it is possible to feed to each step and process at a time a plurality of the articles to be manufactured, it is possible to considerably reduce the time required to carry out an abrading operation in the abrasion step, spin coating and exposure operations in the film-forming step, and a cleaning operation in the cleaning step, as compared with the conventional method in which the articles 6 to be manufactured are fed to and processed in each step one by one, to thereby considerably increase the productivity of the sensor element.

As a result of the spring structure being formed so as to surround each hole 42 by forming a plurality of the cuts 43 around the hole 42, it is possible to sufficiently displace each article 6 to be manufactured within each hole 42 in the direction of the height thereof even in the case where the retaining plate 41 is made of a thick plate having inferior flexibility. Therefore, the variations in the heights of the articles 6 to be manufactured can be sufficiently compensated for, which in turn results in considerably increased productivity.

In the above descriptions, a plurality of the holes 42 that permit the insertion of the small-diameter portion 6b of the article to be manufactured 6 are formed in the retaining plate 41, and a plurality of the cuts 43 are formed so as to surround the hole 42. However, it is also possible to place a plurality of the articles 6 to be manufactured on the retaining plate 41 without forming a plurality of the holes 42 in the retaining plate 41, a part of each article 6 to be manufactured is fixed to the retaining plate 41 by series welding or the like, a plurality of the cuts 43 are formed in the retaining plate 41 so as to surround each article 6 to be manufactured, and the spring structure may be formed around each article 6 to be manufactured by a plurality of the cuts 43.

Figure 18:
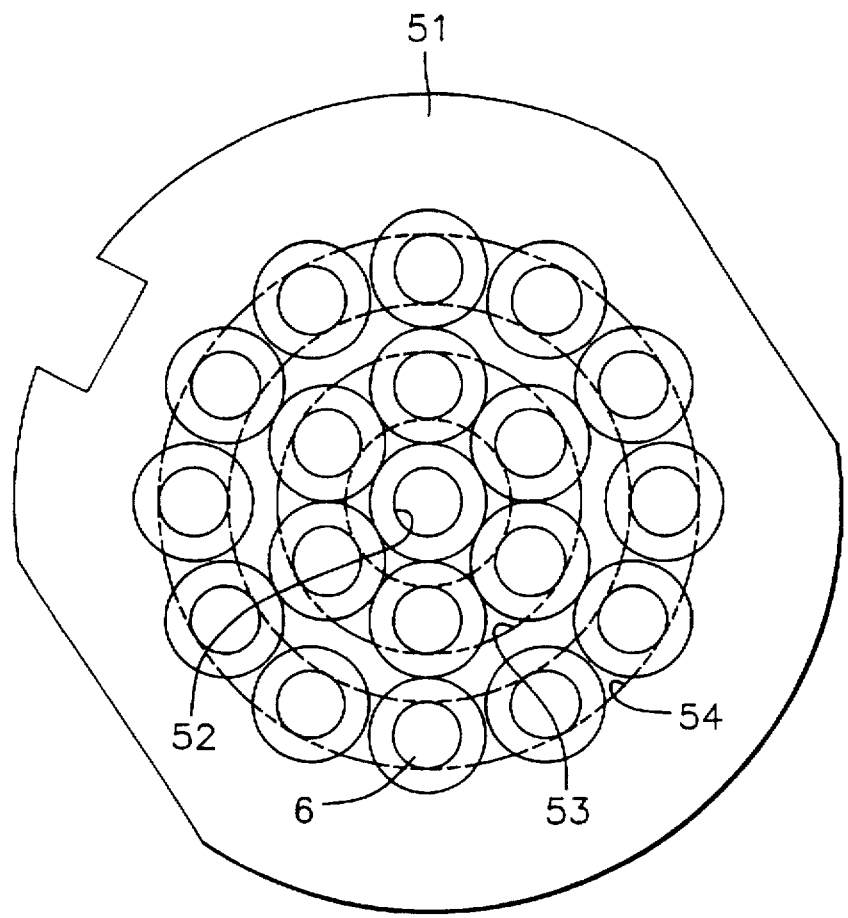
FIG. 18 is a plan view of a retaining plate for use in a sensor element manufacturing method according to a sixth embodiment of the present invention.
Figure 20:
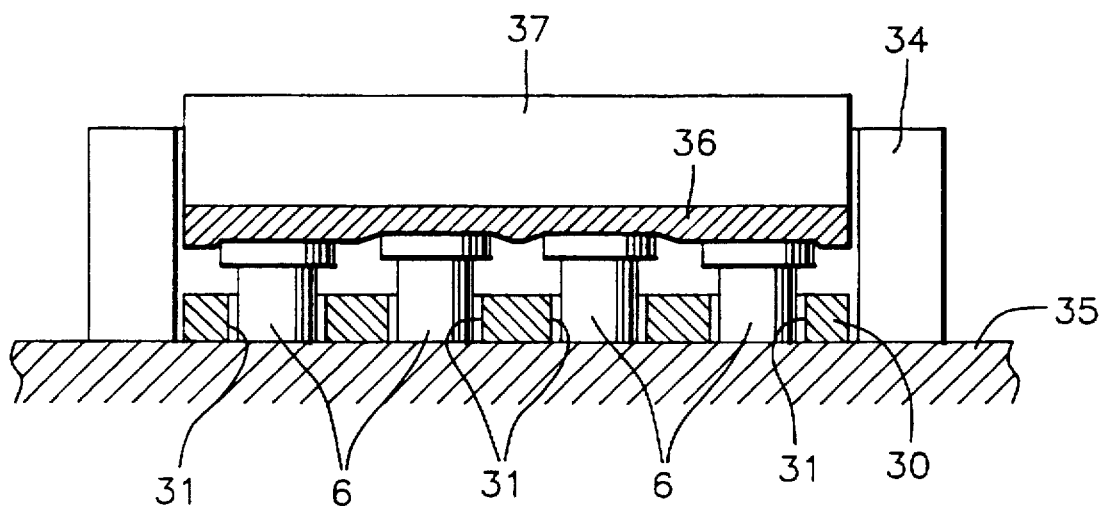
FIG. 20 is an illustrative representation of one example of a conventional sensor element manufacturing method.
Figure 19:
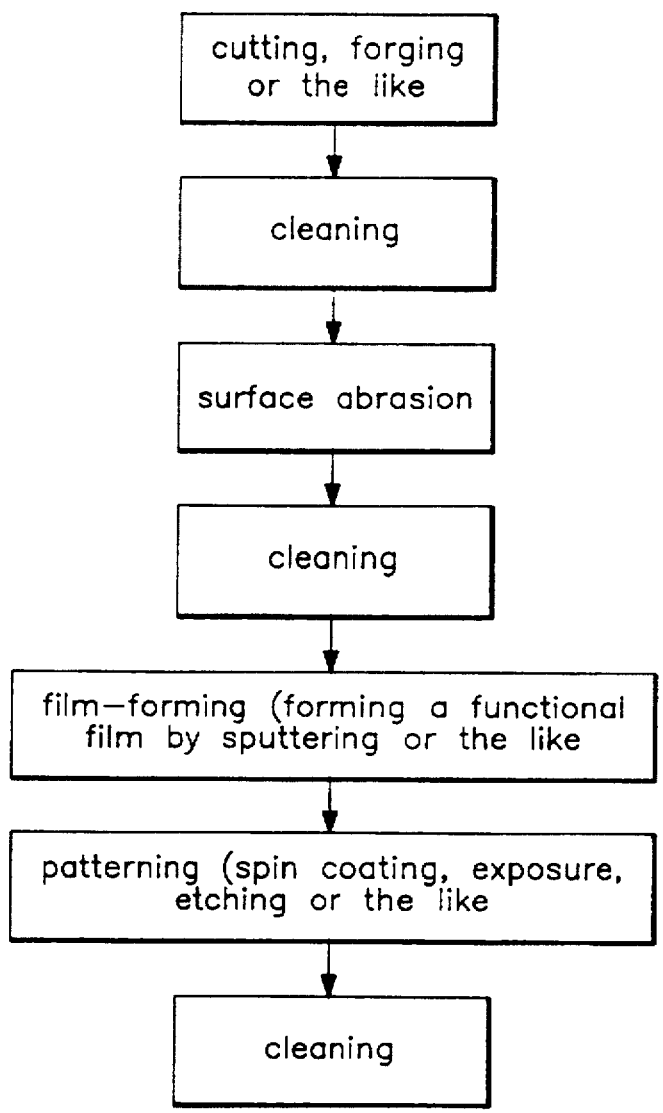
FIG. 19 is a flow chart of steps of a conventional sensor element manufacturing method and a sensor element manufacturing method of the present invention.

FIG. 18 schematically illustrates a retaining plate for use in a sensor element manufacturing method according to a sixth embodiment of the present invention. As in the first embodiment, the sensor element manufacturing method of the sixth embodiment is also based on the method of manufacturing the sensor element 5 (see FIG. 6A) that has a cylindrical shape whose one end is closed, and a circumferential surface formed into two portions: namely, the large-diameter portion 5a and the small-diameter portion 5b. The sensor element manufacturing method of the present embodiment is arranged in such a way that a retaining plate 51 retains a plurality of articles 6 to be manufactured, each article having a cylindrical shape whose one end is closed, and a cicumferential surface formed into two stages: namely, the large-diameter portion 6a and the small-diameter portion 6b. Further, these articles to be manufactured are fed to and processed in each step as a unit, whereby a plurality of the sensor elements 5 are simultaneously manufactured.

The retaining plate 51 is a thin metallic plate that has a thickness of about 100 micrometers, for example, a flexible thin plate consisting of stainless steel possessing superior corrosion resistance, or a thick metallic plate that has a thickness greater than the thin plate, for example, a flexible thin plate consisting of stainless steel possessing superior corrosion resistance. A hole 52 that permits the insertion of the small-diameter portion 6b of the article 6 to be manufactured is formed in the center of the retaining plate 51 by etching, punching, or the like. Further, two annular holes 53 and 54 that permit the insertion of the small-diameter portions 6b of a plurality of the articles 6 to be manufactured are concentrically formed around the hole 52 by etching, punching, or the like. A spring structure is formed in the retaining plate 51 in combination with these holes 52, 53, and 54.

To cause the above-described retaining plate 51 to retain a plurality of the articles 6 to be manufactured, the small-diameter portions 6b of the articles 6 to be manufactured are inserted into the holes 52, 53, and 54, and a part of the large-diameter portion 6a of the article 6 to be manufactured is integrally fixed to the area around the holes 52, 53, and 54 by series welding or the like. In this case, the weld strength is set to such an extent that the articles to be manufactured are not disconnected from the retaining plate during the course of processing in each step, but easily disconnected therefrom after the completion of each step.

A plurality of the articles 6 to be manufactured retained by the retaining plate 51 are fed to and processed as a unit in each of the steps such as abrasion and film-forming steps to thereby simultaneously manufacture a plurality of the sensor elements 5.

In this case, the articles to be manufactured 6 are fixed to the holes 52, 53, and 54, respectively. Therefore, each article 6 to be manufactured will not move in the holes 52, 53, and 54 during the course of the surface abrasion step or the like. Further, even if the pressing force exerted on the turn table becomes partially insufficient for reasons of large variations in the heights of the articles 6 to be manufactured, no sagged areas will arise on an abraded surface. The articles 6 to be manufactured are abraded in decreasing order of height, so that the heights of all the articles to be manufactured become gradually uniform. In the end, all the articles to be manufactured are finished to a uniform height.

As a result, since it is possible to feed to each step and process at a time a plurality of the articles 6 to be manufactured, it is possible to considerably reduce the time required to carry out an abrading operation in the abrasion step, spin coating and exposure operations in the film-forming step, and a cleaning operation in the cleaning step, as compared with the conventional method in which the articles 6 to be manufactured are fed to and processed in each step one by one, to thereby considerably increase the productivity of the sensor element.

As a result of the spring structure being formed on the retaining plate 51 in combination with the hole 52 and the holes 53 and 54 concentrically formed around the hole 52, it is possible to sufficiently displace each article 6 to be manufactured within the holes 52, 53, and 54 in the direction of the height thereof even in the case where the retaining plate 51 is made of a thick plate having inferior flexibility. Therefore, the variations in the heights of a plurality of the articles 6 to be manufactured can be sufficiently compensated for, which in turn results in considerably increased productivity.

Although the two annular holes 53 and 54 are concentrically formed around the hole 52 in the previous descriptions, one annular hole or more than three annular holes may be formed as a matter of course.

By virtue of the arrangement defined in claim 1 of the present invention, the following effects are produced.

It is possible to increase the productivity of the sensor element, because a plurality of articles to be manufactured can be simultaneously processed. Even if there are variations in the heights of a plurality of articles to be manufactured fixed on a single flexible plate, the variations will be compensated for by displacement of the plate in the direction of the heights of the articles to be manufactured. Consequently, the articles to be manufactured can be simultaneously processed with accuracy in each step, and the amount of processing can be rendered uniform.

By virtue of the arrangement defined in claim 2 of the present invention, the following effects are produced.

It is possible to increase the productivity of the sensor element, because a plurality of articles to be manufactured can be simultaneously processed. Even if there are variations in the heights of a plurality of articles to be manufactured fixed on a single flexible plate, the variations will be compensated for by displacement of the plate in the direction of the heights of the articles to be manufactured. Even if the rigidity of the flexible plate becomes increased as result of a plurality of articles to be manufactured being fixed to the flexible plate, the variations in the direction of the heights of the articles to be manufactured as compensated for by the deflection of the cantilevers of each hole. Consequently, the articles to be manufactured can be simultaneously processed with accuracy in each step, and the amount of processing can be rendered uniform.

What is claimed is:

1. A method of processing a plurality of substantially like articles in a batch comprising the steps of:

adhesively fixing the articles to a retaining plate having a flexible portion for each article so as to constitute a unit wherein the articles are fixed to the plate each in a like orientation;

simultaneously processing the articles fixed to the plate while the unit is maintained; and thereafter removing the articles from the plate so that the articles are separated from each other.

2. A method as defined in claim 1 wherein the processing includes an abrasion step performed on corresponding surfaces of each article during which flexible portions of the retaining plate deform due to their flexibility, as required, to compensate for articles having respectively different heights.

3. A method as defined in claim 1 wherein each article is a substantially cylindrical sensor element having one closed end.

4. A method as defined in claim 1 wherein the retaining plate is made of a flexible material so as to form each flexible portion.

5. A method as defined in claim 1 wherein the retaining plate is a thin flexible plate made of metal.

6. A method as defined in claim 1 wherein the retaining plate has a plurality of openings into each of which one of the articles is inserted.

7. A method as defined in claim 6, wherein the openings have flexible pieces for retaining the articles.

8. A method as defined in claim 7, wherein the flexible pieces are cantilevers functioning as a spring.

9. A method as claimed in claim 1 wherein the articles are adhesively fixed to the plate by welding.

* * * * *